United States Patent
Ross et al.

(10) Patent No.: US 9,079,542 B1
(45) Date of Patent: Jul. 14, 2015

(54) RETRACTABLE VEHICLE GRAB HANDLE WITH DEPLOYING INTEGRATED GARMENT HANGER

(71) Applicant: Ford Global Technologies, LLC, Dearborn, MI (US)

(72) Inventors: Brian Douglas Ross, Marine City, MI (US); Jennifer Ann Prescott, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 14/166,213

(22) Filed: Jan. 28, 2014

(51) Int. Cl.
*B60J 9/00* (2006.01)
*B60R 7/10* (2006.01)
*B60N 3/02* (2006.01)

(52) U.S. Cl.
CPC .. *B60R 7/10* (2013.01); *B60N 3/023* (2013.01)

(58) Field of Classification Search
CPC .................................. B60R 7/10; B60N 3/023
See application file for complete search history.

(56) References Cited

U.S. PATENT DOCUMENTS

| 5,419,067 | A |   | 5/1995  | Drummond et al. |
|-----------|---|---|---------|-----------------|
| 5,625,921 | A | * | 5/1997  | Smith ............................. 16/445 |
| 6,095,469 | A |   | 8/2000  | Von Alman |
| 8,465,065 | B2|   | 6/2013  | Browne et al. |
| 2004/0060953 | A1 | * | 4/2004 | Karner ........................... 224/311 |
| 2008/0156837 | A1 | * | 7/2008 | Brightman .................... 224/313 |
| 2012/0319421 | A1 | * | 12/2012 | Ruzich et al. ................ 296/1.02 |

FOREIGN PATENT DOCUMENTS

EP         753427 A2    1/1997

* cited by examiner

*Primary Examiner* — Lori L Lyjak
(74) *Attorney, Agent, or Firm* — Vichit Chea; Price Heneveld LLP (57) ABSTRACT

A deployable hanger for a vehicle comprises a handle operable between deploying and non-deploying positions, two extension members disposed at least partially within the handle and tab members that are free of engagement with the extension members when the handle is in the deploying position, wherein the extension members are oppositely biased toward an extended position, and wherein the tab members selectively engage the extension members when the handle is in the non-deploying position.

20 Claims, 8 Drawing Sheets

RETRACTABLE VEHICLE GRAB HANDLE WITH DEPLOYING INTEGRATED GARMENT HANGER

FIELD OF THE INVENTION

The present invention generally relates to grab handles for vehicles, and more specifically, a multi-functional grab-handle for a vehicle with a deployable garment hanger.

BACKGROUND OF THE INVENTION

Various automobiles include, within passenger seating, a grab-handle for occupants to use during operation and while entering or exiting the vehicle. These grab-handles can be retractable or fixed proximate the headliner of a vehicle. Because of the elevated position of the headliner, various hooks can be disposed near the grab-handle where coats and other clothing can be hung during use of the vehicle.

SUMMARY OF THE INVENTION

According to one aspect of the present invention, a deployable hanger for a vehicle comprises an operable handle, first and second extension members are disposed at least partially within the operable handle and a deploying mechanism selectively deploys the first and second extension members to an extended position when the handle is in a deploying position. The first and second extension members are free of deploying when the operable handle is distal from the deploying position.

According to another aspect of the present invention, a deployable hanger for a vehicle comprises a handle operable between deploying and non-deploying positions and two extension members disposed at least partially within the handle. Also included are tab members that are free of engagement with the extension members when the handle is in the deploying position. The extension members are oppositely biased from one another and toward an extended position. The tab members selectively engage the extension members when the handle is in the non-deploying position.

According to another aspect of the present invention, a convertible handle for a vehicle comprises a handle operable between deploying and non-deploying positions. First and second extension members are at least partially disposed within the handle. The first and second extension members are biased outward from the handle and in opposite directions toward an extended position. A retention mechanism selectively engages the first and second extension members when the handle is in the non-deploying position and is free of engagement with the first and second extension members when the handle is in the deploying position. The first and second extension members are positioned in the extended position when the handle is in the deploying position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
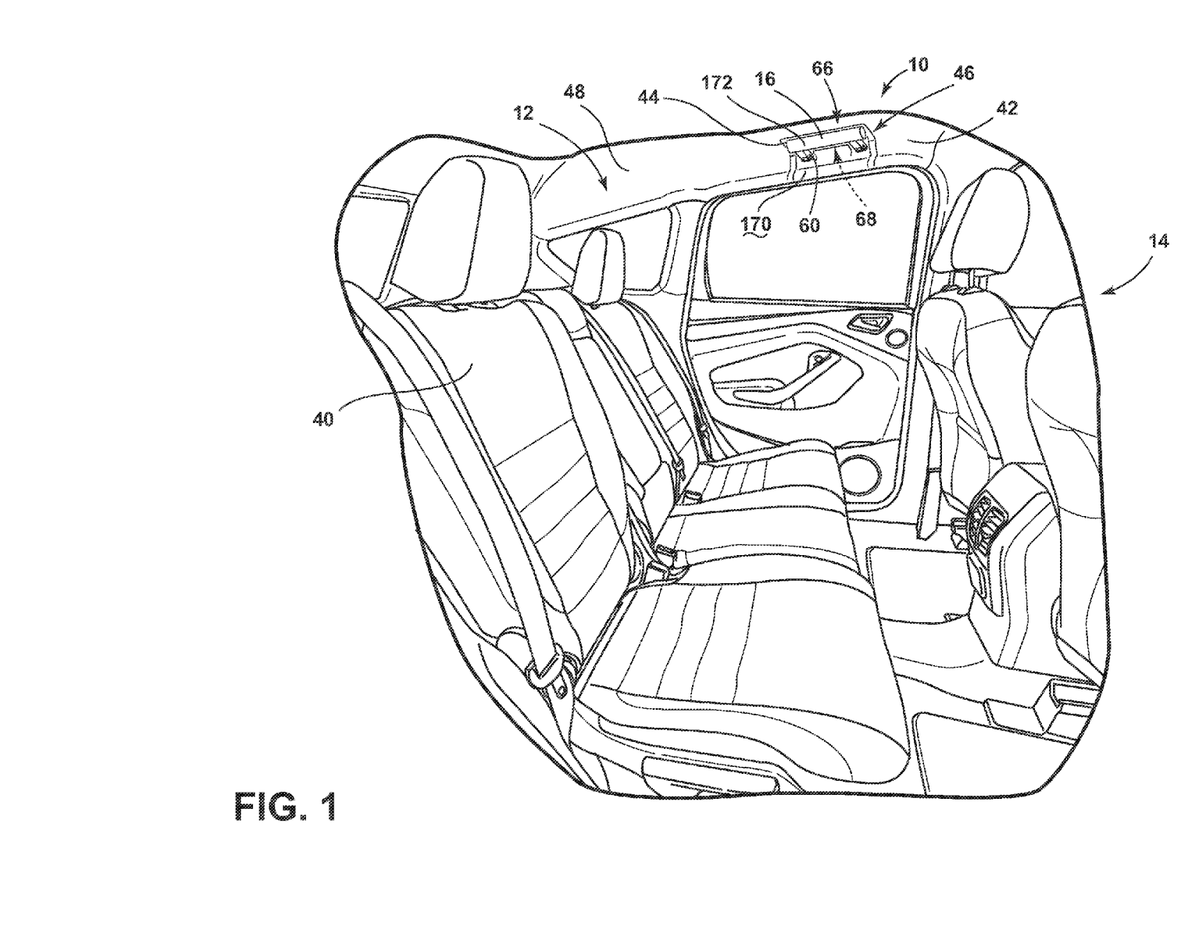
FIG. 1 is a perspective view of a vehicle interior with an embodiment of a deployable garment hanger installed within a headliner of the vehicle in any stored position.
Figures 2, 3:
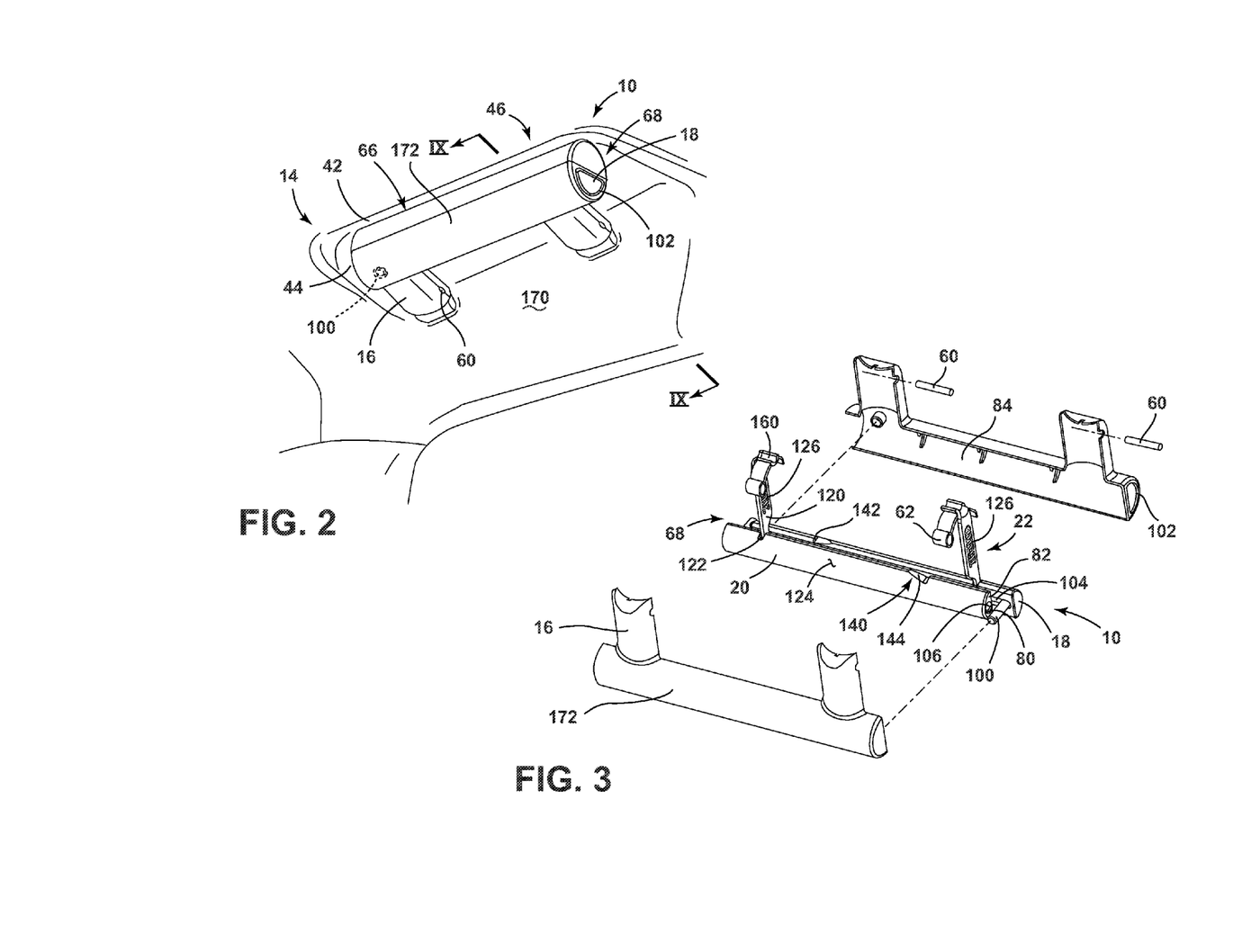
FIG. 2 is a detail bottom perspective view of the embodiment of FIG. 1.
FIG. 3 is a partially exploded top perspective view of one embodiment of the deployable garment hanger in the handle position and the extension members in the loaded position.
Figure 4:
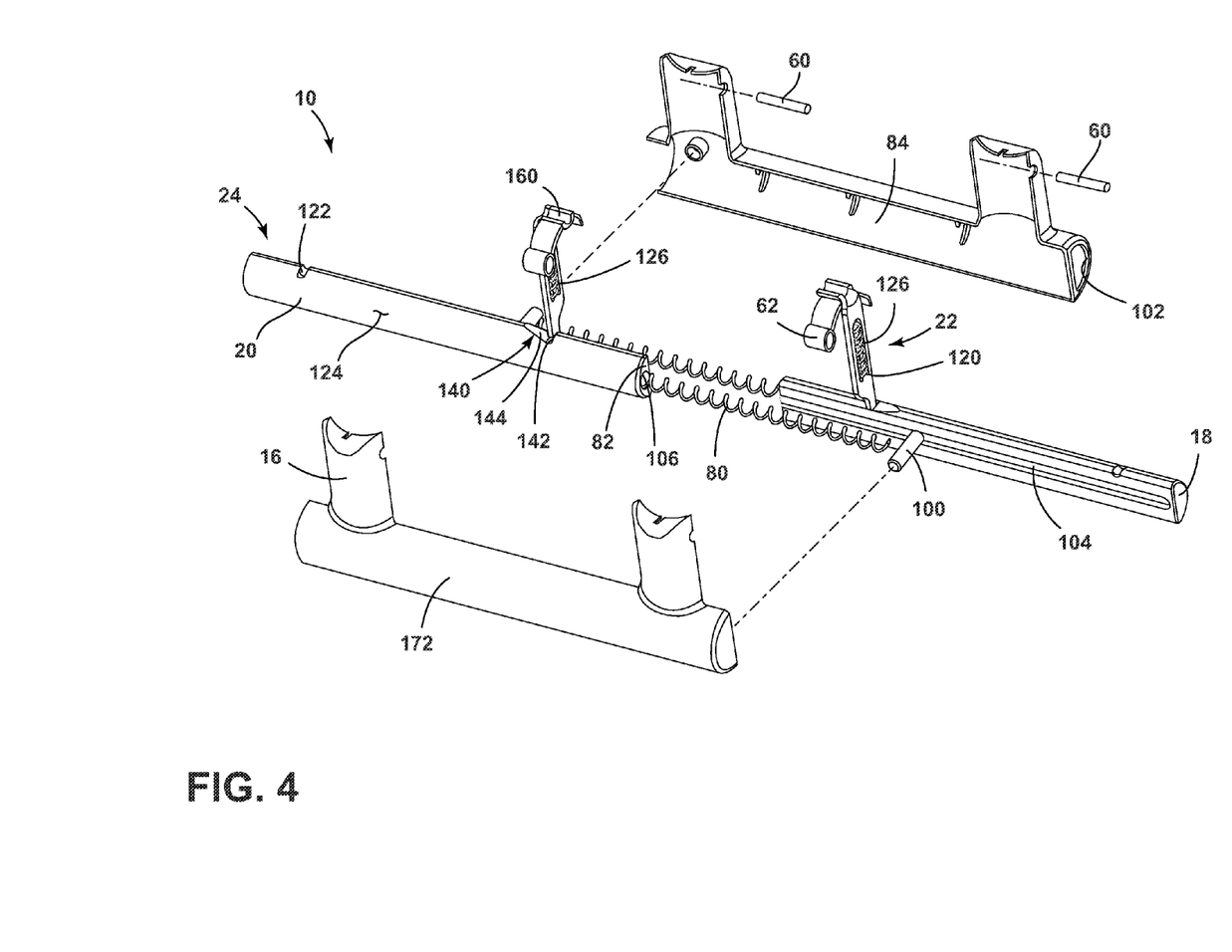
FIG. 4 is a partially exploded top perspective view of the deployable garment hanger in the handle position and the extension members in the extended position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a deployable hanger 10 shown installed within the passenger cabin 12 of a vehicle 14, according to one embodiment. The deployable hanger 10 for a vehicle 14 includes a handle 16 and first and second extension members 18, 20 disposed at least partially within the handle 16. A deploying mechanism 22 selectively deploys the first and second extension members 18, 20 to an extended position 24 when the handle 16 is in a deploying position. The first and second extension members 18, 20 are free of deployment when the handle 16 is positioned distal from the deploying position.

As illustrated in the embodiment of FIGS. 1, 2 and 5-8, the deployable hanger 10 is disposed near a passenger seat 40 within the passenger cabin 12 of the vehicle 14. The deployable hanger 10 can be rotationally attached to the headliner 42 of the vehicle 14, substantially within reach of the occupant of the passenger seat 40. A headliner recess 44 is configured to receive the handle 16 of the deployable hanger 10, wherein the headliner recess 44 defines an area in which the handle 16 can be operably positioned in a stowed position 46, substantially flush within the surrounding areas of the headliner 42. In various embodiments, the deployable hanger 10 can be biased toward a stowed position 46 within the headliner recess 44 such that the handle 16 of the deployable hanger 10 is substantially prevented from colliding with the occupant, while also being available for use by the occupant when desired.

It is contemplated, in various embodiments, that the deployable hanger 10 can be installed within an area of the passenger cabin 12 adjacent to passenger seating 40 between the "B" pillar and "C" pillar, the "C" pillar and "D" pillar, or both. Various alternate embodiments can have a deployable hanger 10 mounted in areas proximate one or more of the "A," "B" or "C" pillars adjacent to a passenger seat 40. It is also contemplated that the deployable hanger 10 can be installed within the ceiling 48 of the vehicle cabin 12, in various embodiments, as well as other similar locations within the vehicle cabin 12.

Referring now to the embodiment of FIGS. 2 and 5-8, the handle 16 is rotationally operable about a pivot point 60 that is coupled with the headliner recess 44. A cam 62 is disposed proximate the pivot point 60, wherein the cam 62 is in communication with the deploying mechanism 22 and the handle 16, such that the movement of the handle 16 activates the deploying mechanism 22 when the handle 16 is disposed in the deploying first rotational position 64. The first rotational position 64 of the handle 16 defines the deploying position in which the extension members are deployed to the extended position 24. The deploying mechanism 22 remains unactivated by the cam 62 when the handle 16 is in a second rotational position 66, wherein the second rotational position 66 is distal from the first rotational position 64. In this manner, according to various embodiments, the deployment of the first and second extension members 18, 20 is accomplished by rotating the handle 16 to the predetermined first rotational position 64 about the pivot point 60. Additionally, when the handle 16 is moved to other positions about the pivot point 60 away from the predetermined first rotational position 64, the deploying mechanism 22 is not activated and the first and second extension members 18, 20 either remain deployed, or, if disposed within the handle 16 in a loaded position 68, remain in the loaded position 68, until such time as the handle 16 is moved to the deploying first rotational position 64. The operation of the deployable hanger 10 will be described in detail more fully below.

Referring now to the embodiment of FIGS. 2, 3 and 9-11, the deploying mechanism 22 includes at least one biasing member 80 that is attached to the first ends 82 of each of the first and second extension members 18, 20, respectively. The biasing member 80 operates to bias the first and second extension members 18, 20 outward from the loaded position 68, at least partially within an interior 84 of the handle 16, toward the extended position 24. The biasing member 80 of the deploying mechanism 22 attached to the first and second extension members 18, 20 can include a number of biasing mechanisms, that can include, but are not limited to, tension springs, compression springs, elastic members, tensioned or compressed members, or other similar biasing mechanisms.

In the various embodiments, the biasing member 80 can be in compression when the first and second extension members 18, 20 are in the loaded position 68 within the handle 16 such that the extension of the biasing member 80 forces one or both of the first and second extension members 18, 20 toward the extended position 24. In other embodiments, the biasing member 80 can be in tension when the first and second extension members 18, 20 are in the loaded position 68 within the handle 16, such that when the tension is released from the biasing member 80, the release of tension moves the first and second extension members 18, 20 outward and toward the extended position 24. It is contemplated that the first and second extension members 18, 20 can be biased by a single biasing member 80 that simultaneously biases, in opposite directions, the first and second extension members 18, 20 toward the extended position 24. In other various embodiments, each of the first and second extension members 18, 20 can include a dedicated biasing member 80, such as first and second biasing members, that individually operate to bias the first and second extension members 18, 20, such as first and second biasing members, respectively, to the extended position 24.

Referring again to the embodiment of FIGS. 2, 3 and 9-11, as the first and second extension members 18, 20 are moved toward the extended position 24, various guide components disposed within the handle 16 are configured to guide the first and second extension members 18, 20 between the loaded and extended positions 68, 24. The handle 16 can include extension apertures 102 through which a respective extension member 18, 20 can protrude, slide, or otherwise move from the loaded position 68 to the extended position 24. In this manner, the extension apertures 102 can at least partially guide and stabilize the first and second extension members 18, 20 as the first and second extension members 18, 20 move from the loaded position 68 toward the extended position 24, and vice versa. The extension apertures 102 can also support the first and second extension members 18, 20 when the first and second extension members 18, 20 are in the extended position 24. The handle 16 can also include the one or more guide members 100 that cooperate with one or more guide channels 104 defined within each of the first and second extension members 18, 20, wherein as each extension member 18, 20 moves toward and away from the extended position 24, the guide channel 104 slides along the guide member 100 to stabilize each of the first and second extension members 18, 20 during deployment and when each extension member 18, 20 is disposed in the extended position 24. It is contemplated that the guide member 100, guide channel 104 and the extension apertures 102 can cooperate to provide stability to the first and second extension members 18, 20 during deployment and when the first and second extension members 18, 20 are in the extended position 24.

In various embodiments, components of the biasing member 80 and the guide members 100 for the first and second extension members 18, 20 can be one and the same. It is contemplated that the biasing members 80, such as first and second biasing springs, for the first and second extension members 18, 20, respectively, can be coupled to the guide member 100 that cooperates with the guide channel 104 of the other of the first and second extension members 18, 20. It is also contemplated that the various guide members 100 and biasing members 80 of the first and second extension members 18, 20, while disposed within the handle 16, can be separate members with distinct structural components.

As further illustrated in the embodiment of FIGS. 2, 3 and 9-11, the biasing members 80 of the first and second extension members 18, 20 can be disposed within the extension members 18, 20 themselves within biasing channels 106 defined within each of the extension members 18, 20. One end of each of the biasing members 80 can be coupled to one of the first and second extension members 18, 20 and the other end of each of the biasing members 80 can be attached to the handle 16 or a securing feature disposed within the handle 16.

As illustrated in the embodiment of FIGS. 2-11, the deploying mechanism 22 can include one or more tab members 120 that selectively engage a loading notch 122 of at least one of the first and second extension members 18, 20. The tab members 120 are configured to be in a slidable engagement within the handle 16, such that the tab members 120 are slidable between engagement and disengagement with the first and second extension members 18, 20. The engagement of the tab member 120 with the loading notch 122 can position the first or second extension member 18, 20, or both, in the loaded position 68 within the handle 16, when the handle 16 is rotated about the pivot point 60 to any of the non-deploying second rotational positions 66. The loading notch 122 of each of the first and second extension members 18, 20 can be a recess defined within the outer surface 124 of each extension member 18, 20 that is positioned such that when either of the first or second extension members 18, 20 are placed in the loaded position 68, the tab member 120 is biased toward and into the loading notch 122. In this manner, the tab member 120 enters the loading notch 122 and prevents the lateral movement of the respective first or second extension member 18, 20 out of the loaded position 68, until the handle 16 is moved to the deploying first rotational position 64, as will be described more fully below. The tab member 120 can be biased by any of a variety of biasing features that can include, but are not limited to, a tab spring 126, elastic members, tensioned or compressed members, and other similar biasing features. In this manner, the tab members 120 are continually biased by the tab spring 126 toward a corresponding extension member 18, 20 such that the movement of the respective extension members 18, 20 into the loaded position 68 will cause the biasing force placed upon the tab member 120 to move the tab member 120 within the loading notch 122 of the respective extension member 18, 20. The biasing force of the tab spring 126 placed upon the tab member 120 can be overcome when the handle 16 is moved into the deploying first rotational position 64, as will be more fully described below.

As shown in the embodiment of FIGS. 2, 3 and 9-11, after the first and second extension members 18, 20 are deployed, the first and second extension members 18, 20 move toward the extended position 24. The tab member 120 is again biased by the tab spring 126 against the corresponding extension member 18, 20 when the handle 16 is moved away from the first rotational position 64. As the corresponding extension member 18, 20 moves toward the extended position 24, the corresponding extension member 18, 20 is free of notches along a portion of its outer surface 124 such that the tab member 120 does not prevent the outward movement of the corresponding extension member 18, 20 to the extended position 24. Once the corresponding extension member 18, 20 is placed in the extended position 24, retention features 140 disposed within the outer surface 124 of each extension member 18, 20 engage the tab members 120 and prevent the outward movement of the respective extension members 18, 20 beyond the extended position 24. The retention features 140 disposed on the first and second extension members 18, 20 can be any one of a plurality of features that can include, but are not limited to, protrusions extending from the outer surface 124 of the first and second extension members 18, 20, recesses defined within the outer surface 124 of the first and second extension members 18, 20, or other similar features that are configured to allow an interference engagement between the tab member 120 and the respective first and second extension member 18, 20 at the extended position 24. It is contemplated that where the retention feature 140 includes a recess disposed within each of the first and second extending members 18, 20, each recess can include an abutment portion 142 and a sloping portion 144 that gradually descends towards the abutment portion 142. In this manner, when the first and second extension members 18, 20 are in the extended position 24 and the corresponding tab member 120, being biased by the tab spring 126, is disposed within the retention feature 140, the user of the deployable hanger 10 can press the first and second extension members 18, 20 inward toward the loaded position 68 such that the tab member 120 will slidably engage the sloping portion 144 of the corresponding retention feature 140. In this manner, the sloping portion 144 overcomes the biasing force of the tab spring 126 placed upon the tab member 120 and allows the tab member 120 to escape the retention feature 140 so that the user can place the first and second extension members 18, 20 within the loaded position 68, wherein the tab members 120 engage the loading notch 122 of the respective first and second extension member 18, 20.

In various alternate embodiments, it is contemplated that the user can pull the handle 16 in a predetermined linear direction, wherein the linear movement of the handle 16 causes the tab members 120 to disengage from the first and second extension members 18, 20 for deployment to the extended position 24. It is also contemplated that a button, switch, or other member disposed on or proximate the handle 16 can be used to deploy the first and second extension members 18, 20 by disengaging the tab members 120 from the loading notch 122. It is further contemplated that in various embodiments, multiple interfaces, as described above, can be implemented within the deployable hanger 10 as alternate methods of deploying the first and second extension members 18, 20. In such an embodiment, a button or switch could be used to deploy the first and second extension members 18, 20 while the user is grasping the handle 16, thereby preventing the handle 16 from moving into the deploying first rotational position 64. In this manner, the button or switch can be used to override the positioning of the handle 16 in the non-deploying second rotational position 66 that prevents deployment of the first and second extension members 18, 20.

As illustrated in the embodiment of FIGS. 2-11, as the handle 16 is rotated about the pivot point 60 in any of the plurality of non-deploying second rotational positions 66, a cam end 160 of the tab member 120 rotates within the headliner 42 of the vehicle 14 and is generally free of engagement with the cam 62. When the handle 16 is moved into the deploying first rotational position 64, the cam end 160 of the tab member 120 is rotated into engagement with the cam 62 that is disposed proximate the headliner 42 and the pivot point 60, wherein the cam 62 is in communication with the tab member 120. As the cam end 160 of the tab member 120 engages the cam 62, the cam 62 overcomes the biasing force of the tab spring 126 and biases the tab member 120 away from the loading notch 122 of the respective extension member 18, 20. When the handle 16 is moved fully into the first rotational position 64 and the cam end 160 of the tab member 120 is fully engaged with the cam 62, the tab member 120, being slidably engaged within the handle 16, is moved away from the corresponding extension member 18, 20 and positioned such that it is free of engagement with the loading notch 122 of the corresponding extension member 18, 20. Once disengaged from the loading notches 122, the first and second extension members 18, 20 are forced by the biasing members 80 outward and into the extended position 24.

As shown in FIGS. 2-11, it is contemplated that the first rotational position 64 can be configured to be a position in which the handle 16 will not typically be used as a grab handle by a user of the vehicle 14. By way of explanation, and not limitation, this position can be where the handle 16 is fully disposed against the lower surface 170 of the headliner 42 of the vehicle 14, such that in order to reach this position, the user of the handle 16 will have to press the handle 16 against the headliner 42 without wrapping the user's hand and/or fingers around a bar portion 172 of the handle 16. In such a configuration, where the user's hand and/or fingers are wrapped around the bar portion 172 of the handle 16, the handle 16 is substantially prevented from touching the headliner 42 of the vehicle 14, thereby preventing the handle 16 from achieving the deploying first rotational position 64 and extending the first and extension members 18, 20.

It is contemplated that various cam members 62 can be used in order to operate the deploying mechanism 22 and the tab members 120 of the deploying mechanisms 22. The various cam members 62 can be disposed within the handle 16, within the headliner 42, within the headliner recess 44 defined within the headliner 42, and other various positions. It is further contemplated that a single cam member 62 can be positioned so as to be in communication with each tab member 120. Alternatively, in various embodiments, each tab member 120 can be in communication with separate dedicated cams 62.

Figures 5, 6:
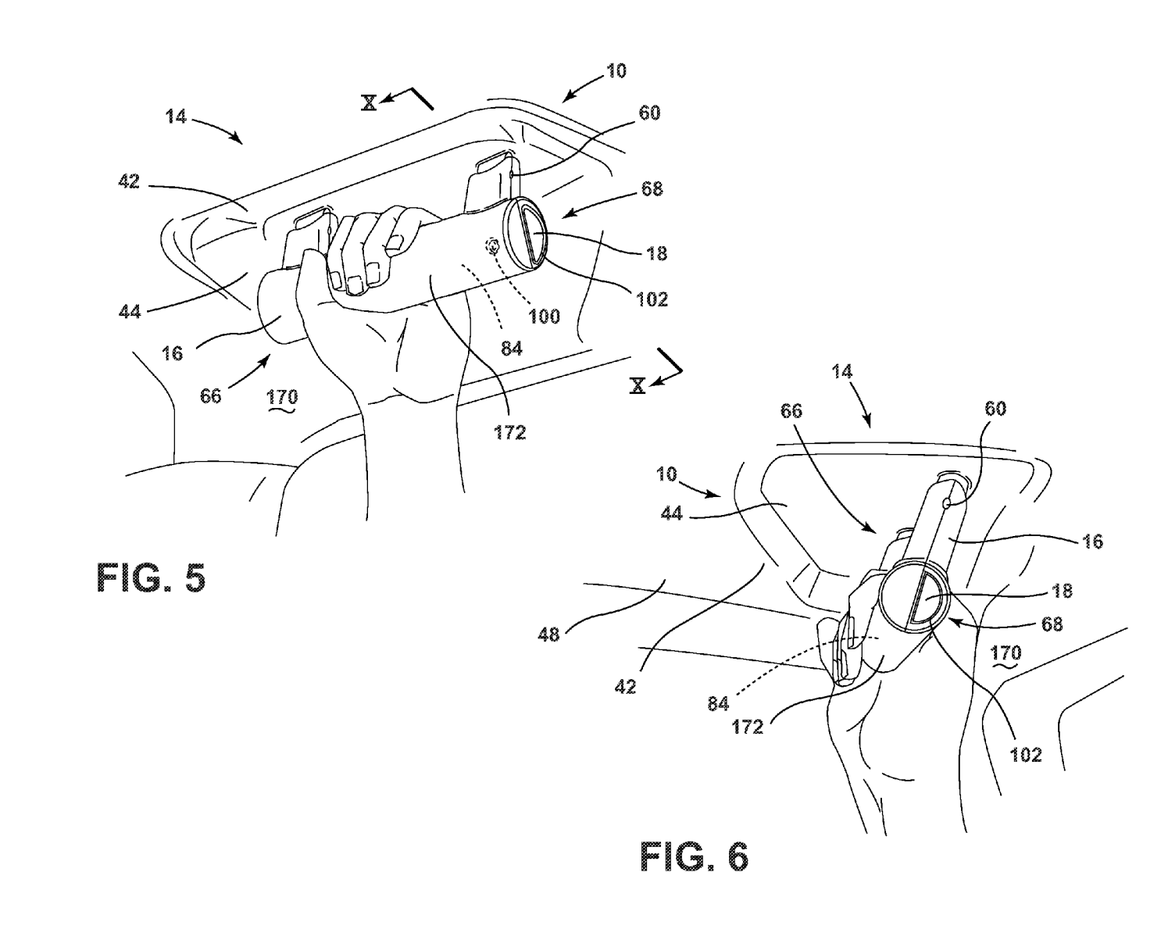
FIG. 5 is a bottom perspective view of the embodiment of FIG. 2 with the deployable garment hanger in the handle position.
FIG. 6 is a side perspective view of the embodiment of FIG. 5.
Figure 7:
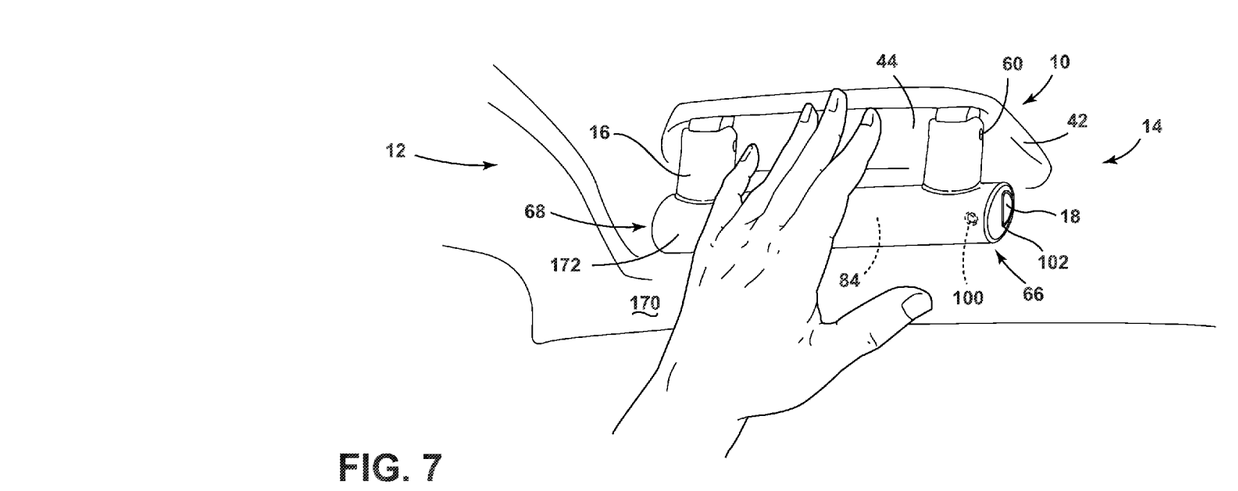
FIG. 7 is a bottom perspective view of the embodiment of FIG. 5 with the deployable garment hanger being pushed toward a deploying position.
Figure 8:
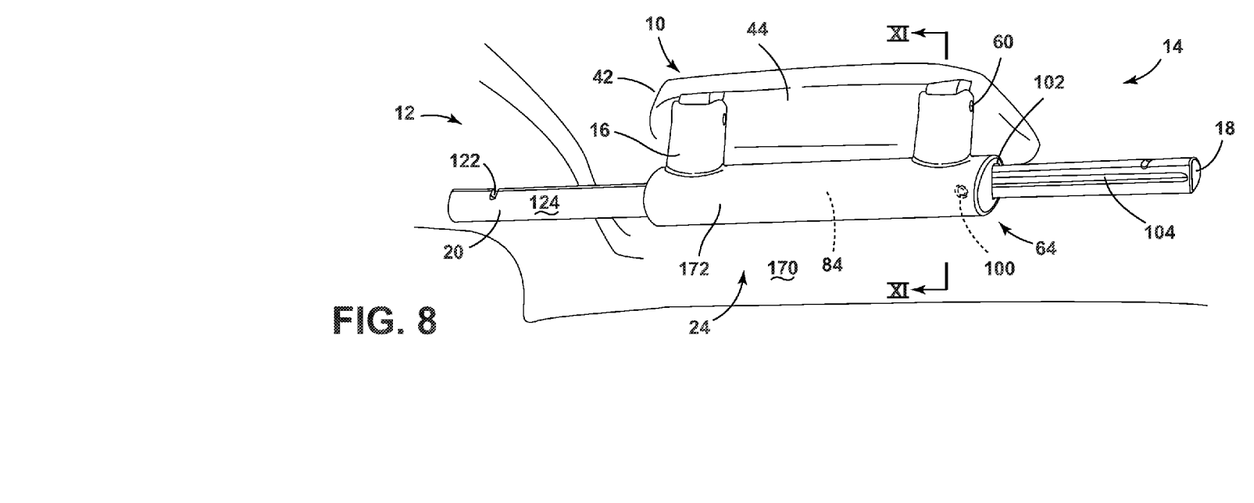
FIG. 8 is a bottom perspective view of the embodiment of FIG. 7 with the deployable garment hanger in the deploying position and the extension members in the extended position.
Figure 9:
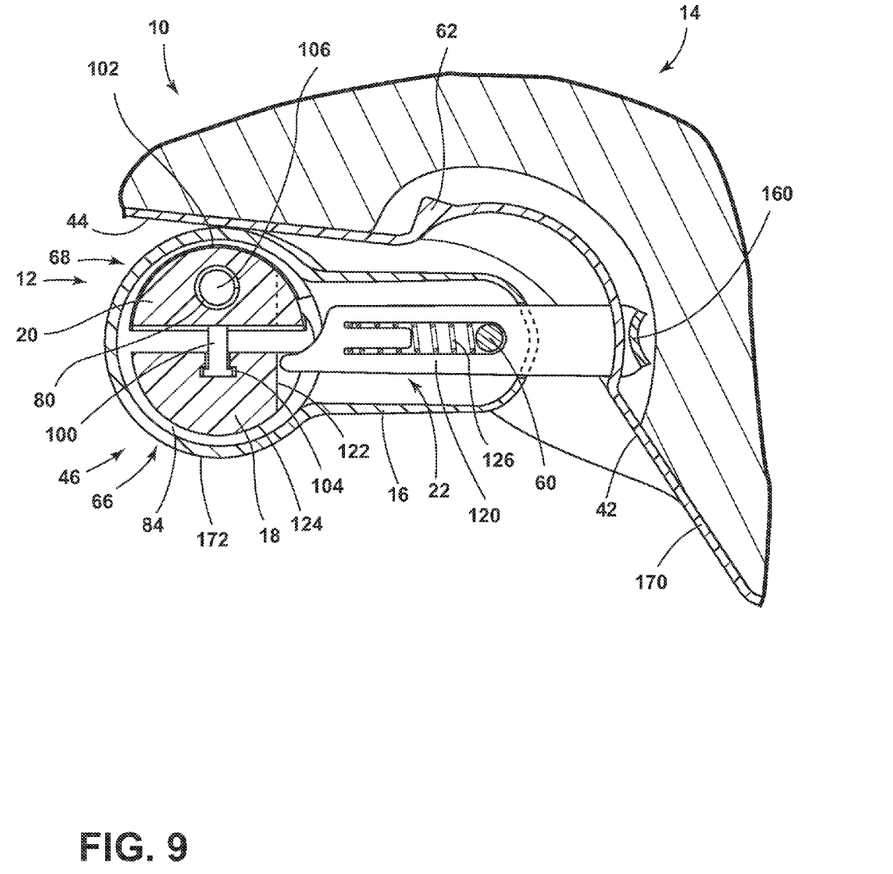
FIG. 9 is a cross-sectional view of the embodiment of FIG. 2 taken at line IX-IX.
Figure 10:
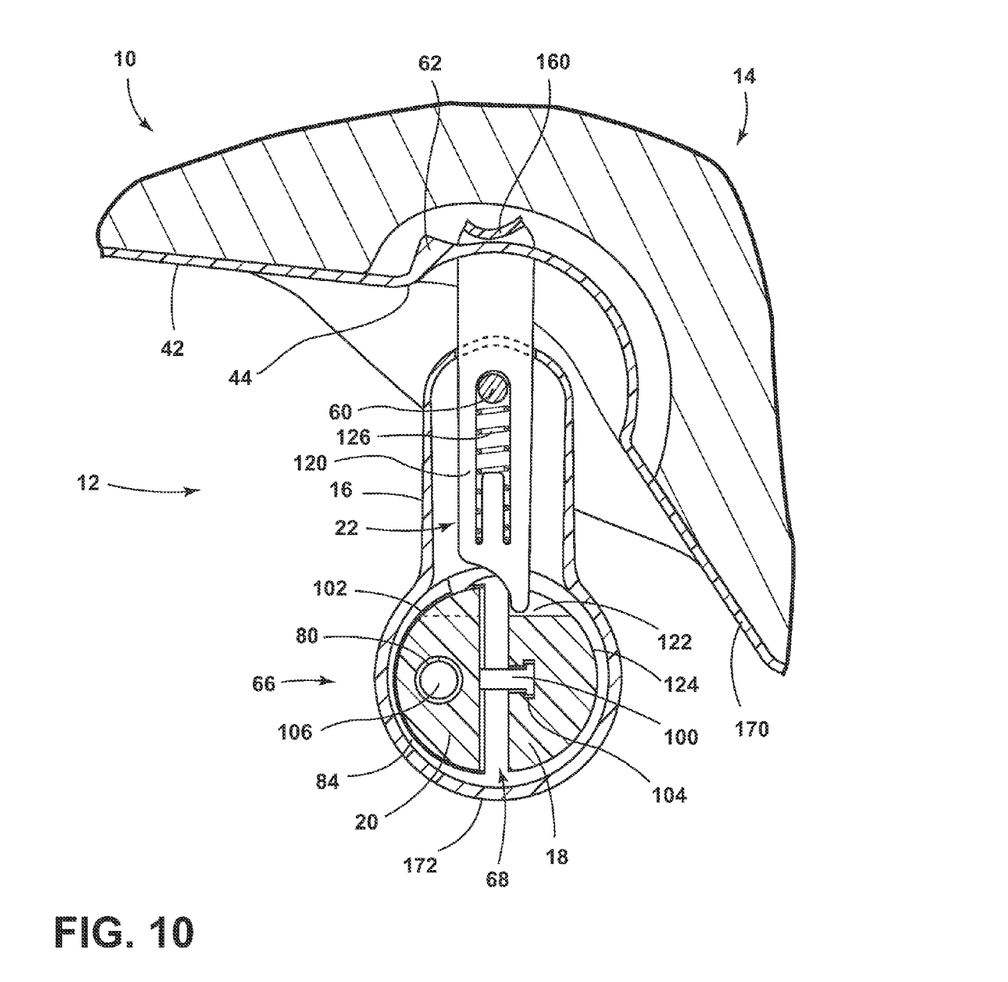
FIG. 10 is a cross-sectional view of the embodiment of FIG. 5 taken at line X-X.
Figure 11:
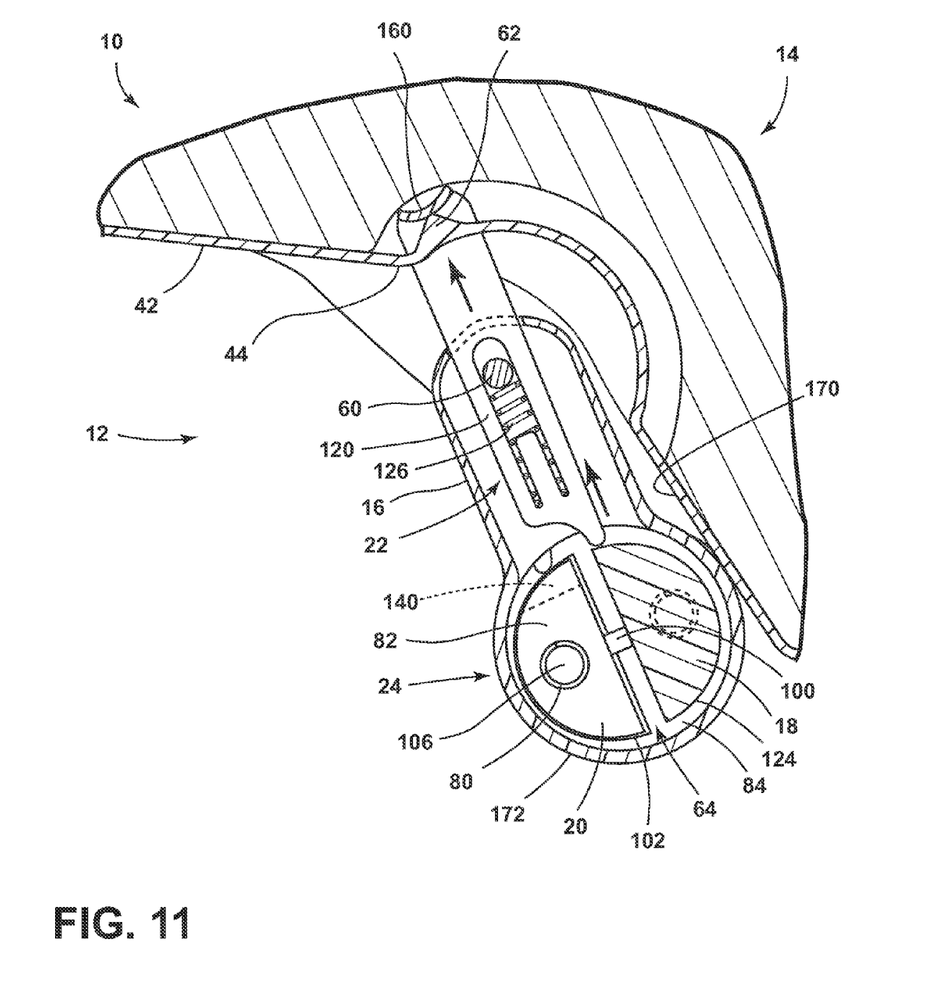
FIG. 11 is a cross section of the embodiment of FIG. 8 taken at line XI-XI.

As illustrated in the embodiment of FIGS. 5 and 6, where a user of the vehicle 14 grasps or otherwise uses the handle 16 in order to steady themselves or to enter or leave the vehicle 14, the user will, typically, grasp the bar portion 172 of the handle 16 wherein the user's hand and/or fingers will substantially surround the entire bar portion 172 of the handle 16. In this manner, and as discussed above, the placement of the user's hand and/or fingers between the headliner 42 and the handle 16 will prevent the handle 16 from entering the first rotational position 64, thereby preventing the first and second extension members 18, 20 from being deployed to the extended position 24.

In various embodiments, the deploying mechanism 22 described above can be used to deploy other features of the handle 16 that can include, but are not limited to, hooks, lids for storage compartments, lights, and other various features.

In various embodiments, it is contemplated that the tab member 120 can be biased outward and away from the first and second extension members 18, 20. In such an embodiment, the cam 62 is configured to release the tab member 120, such that it can be biased outward and away from the corresponding extension members 18, 20, and, therefore, out of the loading notch 122. Accordingly, the first and second extension members 18, 20 can be moved toward the extended position 24. When the handle 16 is moved away from the deploying first rotational position 64, a radial member proximate the cam 62 overcomes the biasing force exerted upon the tab member 120 and forces the tab member 120 toward the respective extension members 18, 20 and into either the loading notch 122 or the retention feature 140. It is contemplated that other cam configurations can be used wherein the handle 16 is moved around the tab members 120 such that the movement of the handle 16 releases the first and second extension members 18, 20 from the tab members 120 to allow the first and second extension members 18, 20 to move toward the extended position 24.

It is contemplated that the deployable hanger 10, in addition to having a cam 62 for activating the tab member 120 to deploy the first and second extension members 18, 20, can also include an intermediate detent, protrusion or other movement-interrupting feature adapted to retain the deployable hanger between the stowed position 46 and the first rotational position 64. In such an embodiment, the deployable hanger 10 is configured to engage the intermediate movement-interrupting feature only when the first and second extension members 18, 20 are deployed to their respective extended positions 24. When the first and second extension members 18, 20 are in the loaded position 68, the handle 16 is biased toward the stowed position 46 without substantial interruption from the intermediate movement-interrupting feature. In the various embodiments, the intermediate movement-interrupting feature can be defined by a selective engagement between various aspects of the deployable hanger 10 and the vehicle 14, including, but not limited to, selective engagement between the handle 16 and the headliner 42, the tab members 120 and a feature disposed proximate the cam 62, and other similar engagements.

It is contemplated that, in various embodiments, the handle 16 of the deployable hanger 10 can be made of a variety of materials that can include, but are not limited to, plastic, composite, metal, combinations thereof, and other similarly rigid materials. It is also contemplated that the first and second extension members 18, 20 can be made of a variety of materials that can include, but are not limited to, plastic, metal, composite, and other rigid materials and, in various embodiments, can be made of flexible materials, wherein the extension members are allowed to sag or droop a predetermined distance. In such an embodiment, when the extension members are in the extended position 24, the sagging or drooping of the extension members substantially mimics the general contour of a coat hanger upon which a jacket, shirt, or other garment can be hung. In embodiments where the extension members 18, 20 can be substantially flexible, the extension members 18, 20 can be made of materials that include, but are not limited to, rubber, soft plastic, foam, segmented rigid members that form a flexible assembly, and other various flexible members.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A deployable hanger for a vehicle comprising:
an operable handle;
first and second extension members disposed at least partially within the operable handle; and
a deploying mechanism that selectively deploys the first and second extension members to an extended position when the handle is in a deploying position, and wherein the first and second extension members are free of deploying when the operable handle is distal from the deploying position.

2. The deployable hanger of claim 1, wherein the handle is rotationally operable about a pivot point, and wherein a cam is disposed proximate the pivot point, wherein the cam is in communication with the deploying mechanism and the handle and activates the deploying mechanism when the handle is disposed in a first rotational position.

3. The deployable hanger of claim 2, wherein the deploying mechanism is free of activation by the cam when the handle is in a second rotational position, the second rotational position being distal from the first rotational position.

4. The deployable hanger of claim 1, wherein the deploying mechanism includes at least one biasing member attached to first ends of each of the first and second extension members, respectively, and wherein the at least one biasing member biases the first and second extension members away from an interior of the operable handle toward the extended position.

5. The deployable hanger of claim 4, wherein the at least one biasing member includes a first biasing member attached to the first end of the first extension member and a second biasing member attached to the first end of the second extension member.

6. The deployable hanger of claim 5, wherein each of the first and second biasing members are springs disposed within the operable handle.

7. The deployable hanger of claim 4, wherein the deploying mechanism includes a tab member that selectively engages a loading notch of at least one of the first and second extension members, and wherein the engagement of the tab member with the loading notch positions at least one of the first and second extension members in a loaded position within the operable handle when the operable handle is in the second rotational position.

8. The deployable hanger of claim 7, wherein when the operable handle is moved to the first rotational position the tab member is selectively disengaged from the loading notch and the at least one biasing member positions the first and second extension members in the extended position.

9. A deployable hanger for a vehicle comprising:
a handle operable between deploying and non-deploying positions;
two extension members disposed at least partially within the handle; and
tab members that are free of engagement with the extension members when the handle is in the deploying position, wherein the extension members are oppositely biased toward an extended position, and wherein the tab members selectively engage the extension members when the handle is in the non-deploying position.

10. The deployable hanger of claim 9, wherein the handle is rotationally operable about a pivot point, and wherein a cam is in communication with the tab members and the handle, and wherein the cam disengages the tab members from the extension members when the handle is in the deploying position.

11. The deployable hanger of claim 10, wherein the deploying position is defined by a predetermined rotational position of the handle about the pivot point.

12. The deployable hanger of claim 9, further comprising:
at least one biasing member coupled with the first and second extension members.

13. The deployable hanger of claim 12, wherein the at least one biasing member includes a first biasing spring attached to a first end of the first extension member and a second biasing spring attached to a first end of the second extension member.

14. The deployable hanger of claim 10, wherein the tab members are slidably operable within the handle, wherein the movement of the handle between the deploying and non-deploying positions slidably operates the tab members relative to the extension members.

15. The deployable hanger of claim 14, wherein the deploying position is defined by a predetermined rotational position of the handle about the pivot point, and wherein the non-deploying position is defined by the handle being distal from the deploying position.

16. The deployable hanger of claim 9, wherein the tab member selectively engages a loading notch of at least one of the extension members, and wherein the engagement of the tab member with the loading notch positions at least one of the extension members in a loaded position within the operable handle when the operable handle is distal from the deploying position.

17. The deployable hanger of claim 16, wherein when the handle is moved to the deploying position, the tab member is selectively disengaged from the loading notch and the extension members are positioned in the extended position.

18. A convertible handle for a vehicle comprising:
a handle operable between deploying and non-deploying positions;
first and second extension members at least partially disposed within the handle, wherein the first and second extension members are biased outward from the handle and in opposite directions toward an extended position; and
a retention mechanism that selectively engages the first and second extension members when the handle is in the non-deploying position and is free of engagement with the first and second extension members when the handle is in the deploying position, and wherein the first and second extension members are positioned in the extended position when the handle is in the deploying position.

19. The deployable hanger of claim 18, wherein the handle is rotationally operable about a pivot point, and wherein the deploying position is defined by a predetermined rotational position of the handle about the pivot point, and wherein the non-deploying position is defined by the handle being distal from the deploying position.

20. The deployable hanger of claim 19, wherein the handle includes a cam positioned proximate the pivot point and is in communication with the retention mechanism and the handle, wherein the cam operates the retention mechanism when the handle is in the deploying position to disengage the retention mechanism from the first and second extension members.

* * * * *